June 3, 1969  H. C. BUCKINGHAM ET AL  3,448,241
SUBMERGED ARC WELDING OF NICKEL STEELS
Filed May 2, 1966
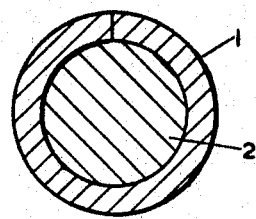
INVENTORS
HERBERT CHARLES BUCKINGHAM
MICHAEL PENSON
BY Townsend & Measure
ATTORNEYS

United States Patent Office 3,448,241
Patented June 3, 1969

3,448,241
SUBMERGED ARC WELDING OF NICKEL STEELS
Herbert Charles Buckingham, St. Albans, and Michael Penson, Harpenden, England, assignors to The British Oxygen Company Limited, a British company
Filed May 2, 1966, Ser. No. 551,811
Claims priority, application Great Britain, May 4, 1965, 18,756/65
Int. Cl. B23K 35/22, 9/18, 25/00
U.S. Cl. 219—146        5 Claims

ABSTRACT OF THE DISCLOSURE

Welds in 9% nickel steel are made by means of a nickel-sheathed tubular electrode having a core containing molybdenum, in conjunction with a molybdenum-rich submerged arc welding flux.

---

This invention relates to the submerged arc welding of nickel steels in which weld metal including a significant proportion of nickel is formed.

A type of steel which is particularly suitable for the fabrication of those pressure vessels and containers that are to be used at low temperatures, say −196° C., is that known as 9% nickel steel. This type does not require post weld heat treatment when welded in accordance with ASME code 1308. Satisfactory welding of 9% nickel steel has been carried out for some years with manual and semiautomatic electrodes yielding weld metal of 75% nickel 15% chromium, remainder iron, brt the cost of these electrodes tends to be high as a result of the high alloy content of the alloyed wire used in the electrode.

More recently it has been proposed that submerged arc welding of 9% nickel steel can be carried out with an alloyed electrode wire containing approximately 66% nickel and 27% molybdenum but this wire is again costly. The weld metals produced from such wires are not adversely affected by dilution from the parent plate.

It is an object of this invention to enable welding of 9% nickel steel to be effected using a less costly electrode wire/flux combination but producing weld metal having similar advantages.

According to the invention, in a process for the submerged arc welding of nickel steels a tubular electrode having a nickel sheath and a core including molybdenum is used in conjunction with a low-silicon molybdenum-rich submerged arc welding flux to produce a weld metal of approximate composition 32–45% nickel, 10–25% molybdenum, remainder mainly iron, molybdenum being contributed to the weld metal both from the core and from the flux.

A tubular electrode for use in this process may have a sheath of commercially pure nickel embracing a core of powdered molybdenum or ferromolybdenum.

A low silicon molybdenum-rich submerged arc welding flux for use in this process may comprise a bonded mixture of slag forming ingredients and metal powder.

A suitable flux composition may be made from a bonded mixture of the following ingredients:

|  | Percent by weight |
|---|---|
| Fluorspar | 35–55 |
| Rutile | 7–27 |
| Zirconium silicate | 0–5 |
| Manganese silicate | 0–5 |
| Manganese | 0–15 |
| Ferromolybdenum | 15–30 |
| Aluminum oxide | 0–5 |
| Manganous oxide | 0–5 |

Importance is attached to limiting the content of silicon compounds in the flux composition. Successful results have however been obtained by bonding a mixture of these powdered ingredients with approximately 12.5% potassium silicate solution (66° Twaddell), baking at 450° C. and granulating the bonded composition. Other suitable bonding agents may also be used.

A specific flux composition within these limits was made as indicated using the following ingredients:

|  | Percent by weight |
|---|---|
| Fluorspar | 45 |
| Rutile | 17 |
| Zirconium silicate | 2 |
| Manganese silicate | 5 |
| Manganese | 7 |
| Ferromolybdenum (68% molybdenum) | 24 |

This specific flux was used as a conventional submerged arc welding flux in conjunction with an electrode wire comprising a sheath of commercially pure nickel embracing a powdered core consisting solely of ferromolybdenum (68% molybdenum), the ratio of sheath to powdered core was approximately 2:1 by weight.

The preferred method of welding involved relatively few passes with high dilution of the weld metal by the parent plate.

Using the specific flux described above and the corresponding tubular electrode, of ⅛ inch diameter, a two-pass butt weld was made between two ⅜ inch thick plates of 9% nickel steel.

The plate edge preparation included a ⅛ inch root face and two 75° bevels. Preheating and inter-pass heating was effected to raise the plate temperature to 100–200° C. Both welding runs were made at speeds of 20 inches per minute, with direct welding current, electrode positive. Welding currents were 480 amperes at 26 volts for the first run, and 600 amperes at 27 volts for the second.

The weld metal percentage composition was as follows:

| Carbon | 0.07 |
|---|---|
| Manganese | 1.10 |
| Silicon | 0.17 |
| Sulphur | 0.04 |
| Molybdenum | 11.1 |
| Nickel | 32.4 |
| Remainder iron. | |

The ultimate Tensile Stress determined from a transverse specimen was 44.9 tons/sq. inch. At a testing temperature of −196° C., with reduced section specimens, the Charpy Vee impact properties (centre line) were 30, 30, 31.5 foot pounds. Longitudinal root and face bend tests, through 180°, were satisfactory.

In a second weld of 9% nickel steel using the same flux and electrode, plates ⅝ inch thick were butt welded in two passes.

For this second weld the welding current was 500 amperes D.C. at 26 volts for the first pass and 650 amperes at 30 volts for the second.

The weld metal analysis was:

|  | Percent by weight |
|---|---|
| Carbon | 0.05 |
| Manganese | 0.65 |
| Silicon | 0.1 |
| Sulphur | 0.022 |
| Phosphorus | 0.033 |
| Molybdenum | 11.8 |
| Nickel | 32.3 |
| Remainder iron. | |

The Ultimate Tensile Stress determined from a transverse specimen was 43 tons per square inch.

Charpy Vee impact properties (centre line), with full size specimens, were as follows at the testing temperatures indicated:

23° C.—74, 72.5, 72.5 foot pounds.
—196° C.—66.5, 62.0, 61.0 foot pounds.

Bend tests were satisfactory.

In a third weld of 9% nickel steel using the same flux and electrode, plates 5/8 inch thick were butt welded in four passes. Welding currents in the range 380–575 amperes D.C. were used. Mechanical tests of weld metal, including impact tests in the heat-affected zone, were satisfactory. The weld metal analysis, set out below, is interesting in that it shows the effect of lower dilution by parent plate where more weld runs are made:

| | Percent |
|---|---|
| Carbon | 0.04 |
| Manganese | 1.36 |
| Silicon | 0.26 |
| Sulphur | 0.003 |
| Molybdenum | 21.2 |
| Nickel | 43.3 |

Remainder iron.

In addition to the advantage of lower combined cost of electrode wire and flux, noticeable improvements in weldability were observed. Thus using the specific flux described welds of particularly good appearance were obtained, slag detachability was good, and the arc was stable during welding. More satisfactory operation was obtained both with direct and alternating welding current.

Modifications of the flux and electrode are possible. Thus in certain circumstances it may be possible to substitute molybdenum powder for ferromolybdenum, and some or all of the manganese may be contributed to the weld metal by the electrode core.

The electrode may be used with other fluxes for the deposition of less highly alloyed weld metal, and the low silicon molybdenum-rich flux may be used with conventional electrodes for deposition of nickel steels particularly where a large amount of dilution by parent plate takes place.

A typical electrode manufactured in accordance with the invention is illustrated in the accompanying cross-sectional drawing, on an enlarged scale, in which the reference number 1 indicates a sheath of commercially pure nickel and the reference numeral 2 a core consisting solely of powdered ferromolybdenum (68% molybdenum). The ratio of sheath to powdered core is approximately 2:1 by weight.

The above example is given solely by way of illustration, and is not to be construed as limiting the spirit and scope of the invention as defined in the appended claims.

We claim:

1. In a process for the submerged arc welding of approximately 9% nickel steels, the step of using a tubular electrode having a nickel sheath and a core including mainly molybdenum in conjunction with a low-silicon molybdenum-rich submerged arc welding flux to produce a weld metal of approximate composition by weight 32–45% nickel, 10–25% molybdenum, remainder mainly iron, molybdenum being contributed to the weld metal both from the core and from the flux, the ratio of sheath:core being approximately 2:1 by weight.

2. A submerged arc welding process as claimed in claim 1, wherein the tubular electrode has a sheath of commercially pure nickel embracing a core of powdered molybdenum or ferromolybdenum.

3. A submerged arc welding process as claimed in claim 1, wherein the low-silicon molybdenum-rich flux comprises a bonded mixture of slag-forming ingredients and metal powder, the metal powder including by weight from 15 to 20% ferromolybdenum.

4. A submerged arc welding process as claimed in claim 3, wherein the flux is a bonded mixture of the following ingredients:

| | Percent by weight |
|---|---|
| Fluorspar | 35–55 |
| Rutile | 7–27 |
| Zirconium silicate | up to 5 |
| Manganese silicate | up to 5 |
| Manganese | up to 15 |
| Ferromolybdenum | 15–30 |
| Aluminum oxide | up to 5 |
| Manganous oxide | up to 5 |

5. A submerged arc welding process as claimed in claim 4, wherein the flux is a bonded mixture of the following ingredients:

| | Percent by weight |
|---|---|
| Fluorspar | 45 |
| Rutile | 17 |
| Zirconium silicate | 2 |
| Manganese silicate | 5 |
| Manganese | 7 |
| Ferromolybdenum (68% molybdenum) | 24 |

References Cited

UNITED STATES PATENTS 3,328,557   6/1967   Rogers et al. _____ 219—146

OTHER REFERENCES

C. J. Holslag, "Let Us Not Go Backwards!" "The Welding Engineer," February 1943, pp. 58 and 59.

RICHARD M. WOOD, *Primary Examiner.*

R. F. STAUBLY, *Assistant Examiner.*

U.S. Cl. X.R.

219—73, 137